United States Patent
Hatta et al.

(10) Patent No.: US 9,748,553 B2
(45) Date of Patent: *Aug. 29, 2017

(54) BATTERY PACK

(71) Applicant: NISSAN MOTOR CO., LTD., Yokohama-shi, Kanagawa-ken (JP)

(72) Inventors: Kentaro Hatta, Kawasaki (JP); Makoto Iwasa, Chigasaki (JP); Nobuhiro Mori, Odawara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 190 days.

This patent is subject to a terminal disclaimer.

(21) Appl. No.: 14/699,583

(22) Filed: Apr. 29, 2015

(65) Prior Publication Data

US 2015/0263328 A1  Sep. 17, 2015

Related U.S. Application Data

(62) Division of application No. 13/383,953, filed as application No. PCT/JP2010/004495 on Jul. 12, 2010, now Pat. No. 9,048,484.

(30) Foreign Application Priority Data

Jul. 17, 2009 (JP) .................................. 2009-169010

(51) Int. Cl.
- *H01M 2/34* (2006.01)
- *B60K 1/04* (2006.01)
- *H01M 2/10* (2006.01)

(52) U.S. Cl.
CPC ................. *H01M 2/34* (2013.01); *B60K 1/04* (2013.01); *H01M 2/1083* (2013.01); *B60K 2001/0438* (2013.01); *H01M 2220/20* (2013.01)

(58) Field of Classification Search
CPC .. H01M 2/34; H01M 2/1083; H01M 2220/20; B60K 1/04; B60K 2001/0438
See application file for complete search history.

(56) References Cited

U.S. PATENT DOCUMENTS

| | | |
|---|---|---|
| 5,451,475 A | 9/1995 | Ohta et al. |
| 5,534,364 A | 7/1996 | Watanabe et al. |
| 6,188,574 B1 | 2/2001 | Anazawa |
| 7,749,644 B2 | 7/2010 | Nishino |

(Continued)

FOREIGN PATENT DOCUMENTS

| | | |
|---|---|---|
| CN | 101209561 A | 7/2008 |
| JP | 7-59204 A | 3/1995 |

(Continued)

OTHER PUBLICATIONS

Third Party Submission Under 37 C. F. R. § 1.99, Jul. 9, 2012, 1 pg.

(Continued)

*Primary Examiner* — Cythia K Walls
(74) *Attorney, Agent, or Firm* — Foley & Lardner LLP

(57) ABSTRACT

A battery pack is disposed at a lower part of a vehicular body. The battery pack (13) includes: a protrusion protruding in a vehicular upward direction and disposed at an upper face of the battery pack, and a dent portion disposed at the upper face of the battery pack (13) and formed lower than the protrusion, wherein an accessory is disposed in the dent portion.

12 Claims, 4 Drawing Sheets

(56) References Cited

U.S. PATENT DOCUMENTS

| | | |
|---|---|---|
| 7,926,601 B2 | 4/2011 | Ono et al. |
| 8,012,620 B2 | 9/2011 | Takasaki et al. |
| 2006/0016633 A1 | 1/2006 | Fujii et al. |
| 2007/0062746 A1 | 3/2007 | Yamamoto et al. |
| 2007/0284167 A1 | 12/2007 | Watanabe et al. |
| 2008/0160394 A1 | 7/2008 | Takasaki et al. |
| 2008/0314657 A1 | 12/2008 | Ikeda et al. |
| 2009/0152034 A1* | 6/2009 | Takasaki ............... B60K 1/04 180/68.5 |

FOREIGN PATENT DOCUMENTS

| | | |
|---|---|---|
| JP | 7-14564 A | 1/1996 |
| JP | 2000-62473 A | 2/2000 |
| JP | 2004-311157 A | 11/2004 |
| JP | 2005-205945 A | 8/2005 |
| JP | 2006-080042 A | 3/2006 |
| JP | 2006-228526 A | 8/2006 |
| JP | 2006-335244 A | 12/2006 |
| JP | 2008-162497 A | 7/2008 |
| JP | 2008-162501 A | 7/2008 |
| JP | 2009-4323 A | 1/2009 |
| JP | 2009-83601 A | 4/2009 |
| RU | 2030027 A | 2/1995 |
| RU | 2185692 A | 7/2002 |
| WO | WO 2010/033881 A1 | 3/2010 |

OTHER PUBLICATIONS

"Escape Hybrid Mariner Hybrid Emergency Response Guide", Sep. 29, 2007, URL:http://www.fordtechservice.dealerconnection.com/vdirs/quickref/guide-escape_pdf.

Supplementary European Search Report, dated May 6, 2014, 10 pgs.

Chinese Office Action dated Dec. 3, 3012, 8 pgs.

Japanese Office Action and English language translation dated Dec. 10, 2013, 4 pgs.

Japanese Office Action with English language translation dated Jun. 3, 2014, 4 pgs.

* cited by examiner

BATTERY PACK

TECHNICAL FIELD

The present invention relates to a battery pack installed in an electric vehicle.

BACKGROUND ART

Ordinarily, a battery pack incorporating therein a battery module is installed in an electric vehicle. For putting the battery pack into a maintenance and the like, a technology using a breaker for breaking electrical connection of the battery pack is developed, so as to secure safety (see patent literature 1). The breaker of the patent literature 1 is protected by surrounding the breaker with boot members.

CITATION LIST

Patent Literature

[Patent Literature 1] Japanese Patent Application Laid-Open No. 2009-83601 (JP2009083601)

SUMMARY OF INVENTION

Technical Problem

According to the background art, however, the breaker is disposed in a relatively high position of the battery pack. Thereby, a foreign matter such as a gravel stone entering an area between a vehicular body and the battery pack, may hit the breaker by way of the boot members. Therefore, even protecting the breaker with the boot members may cause a fear that a shock from the foreign matter is transmitted to the breaker by way of the boot member, thus damaging the breaker.

It is therefore an object of the present invention to provide a battery pack capable of securely protecting an accessory such as breaker and the like.

Solution to Problem

According to a first aspect of the present invention, there is provided a battery pack disposed at a lower part of a vehicular body, the battery pack comprising: a protrusion protruding in a vehicular upward direction and disposed at an upper face of the battery pack, and a dent portion disposed at the upper face of the battery pack and formed lower than the protrusion, wherein an accessory is disposed in the dent portion.

According to a second aspect of the present invention, there is provided a battery pack disposed at a lower part of a vehicular body, the battery pack comprising: an upper face, including: a protrusion protruding in a vehicular upward direction, and a dent portion formed lower than the protrusion, wherein an accessory is disposed in the dent portion.

Advantageous Effect of Invention

With the battery pack according to the present invention, the protrusion is formed higher than the dent portion where an accessory is disposed. With this, even when a foreign matter flies toward the battery pack, the protrusion serves as a protective wall, thus preventing the foreign matter from entering the dent portion. In this way, the accessory can be effectively protected.

DESCRIPTION OF EMBODIMENTS

Figure 1:
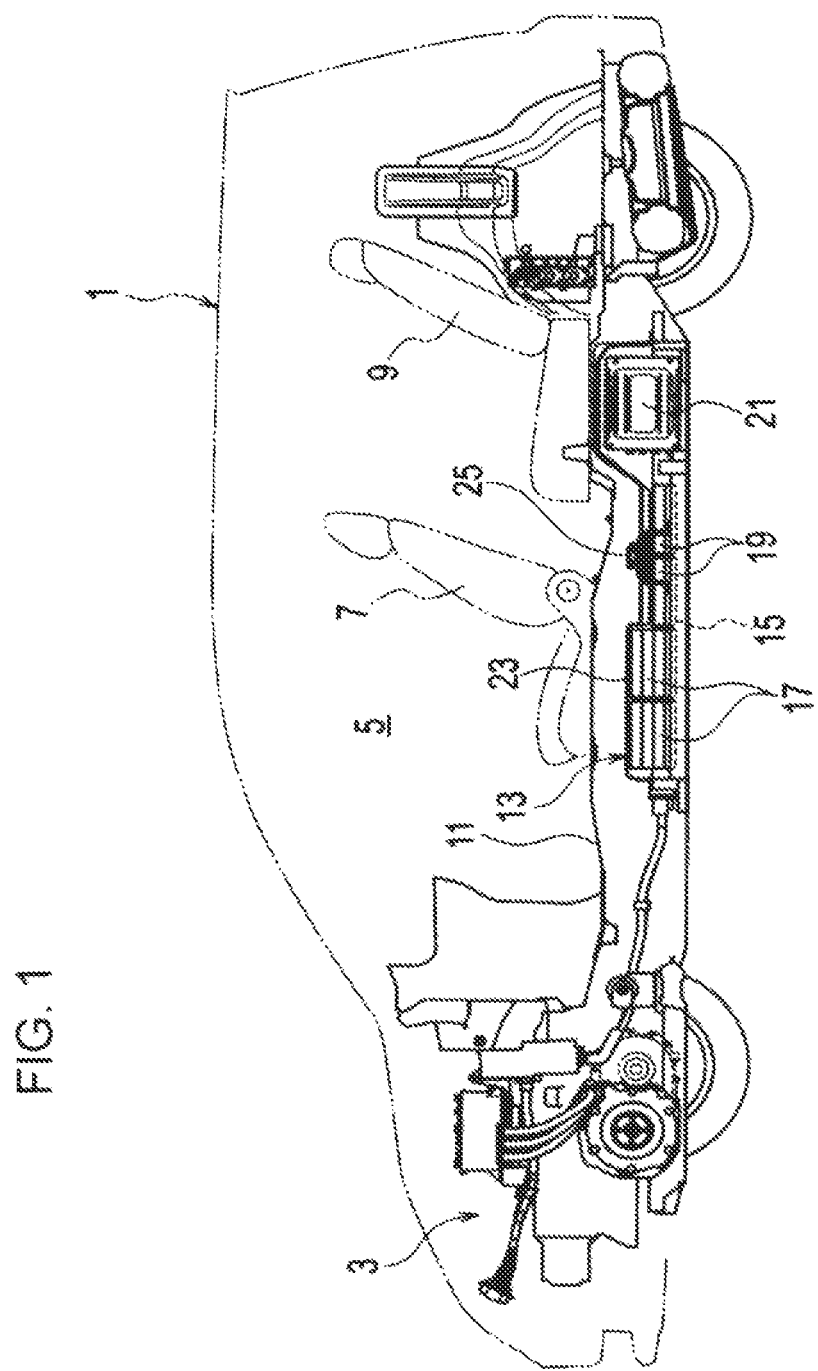
FIG. 1 is a side view schematically showing a vehicle having a battery pack, according to an embodiment of the present invention.

Hereinafter, an embodiment of the present invention is to be set forth in detail referring to the drawings. In the drawings, FR denotes a forward direction in the forward-backward direction of a vehicle and WD denotes a widthwise direction WD of the vehicle.

FIG. 1 is a side view schematically showing a vehicle 1 having a battery pack 13, according to the embodiment of the present invention.

In the front part of the vehicle 1, there is provided a front compartment 3 incorporating therein a motor and the like. In the vehicular backward part of the front compartment 3, there is provided a room 5.

In the room 5, a from seat 7 is disposed at the front side while a rear seat 9 is disposed at the rear side. From the front part of the room 5 to an area close the front seat 7, a floor tunnel portion 11 is formed in the center part in the vehicular widthwise direction WD. Below the front seat 7 and rear seat 9, there is disposed the battery pack 13 according to the embodiment. On a pack base face 15 of the battery pack 13, a first battery module 17, a second battery module 19, a third battery module 21 and a breaker 25 are arranged along the vehicular forward and rearward direction. Then, an upper face cover 23 are so disposed as to cover the first battery module 17, the second battery module 19, the third battery module 21 and the breaker 25.

Figure 2:
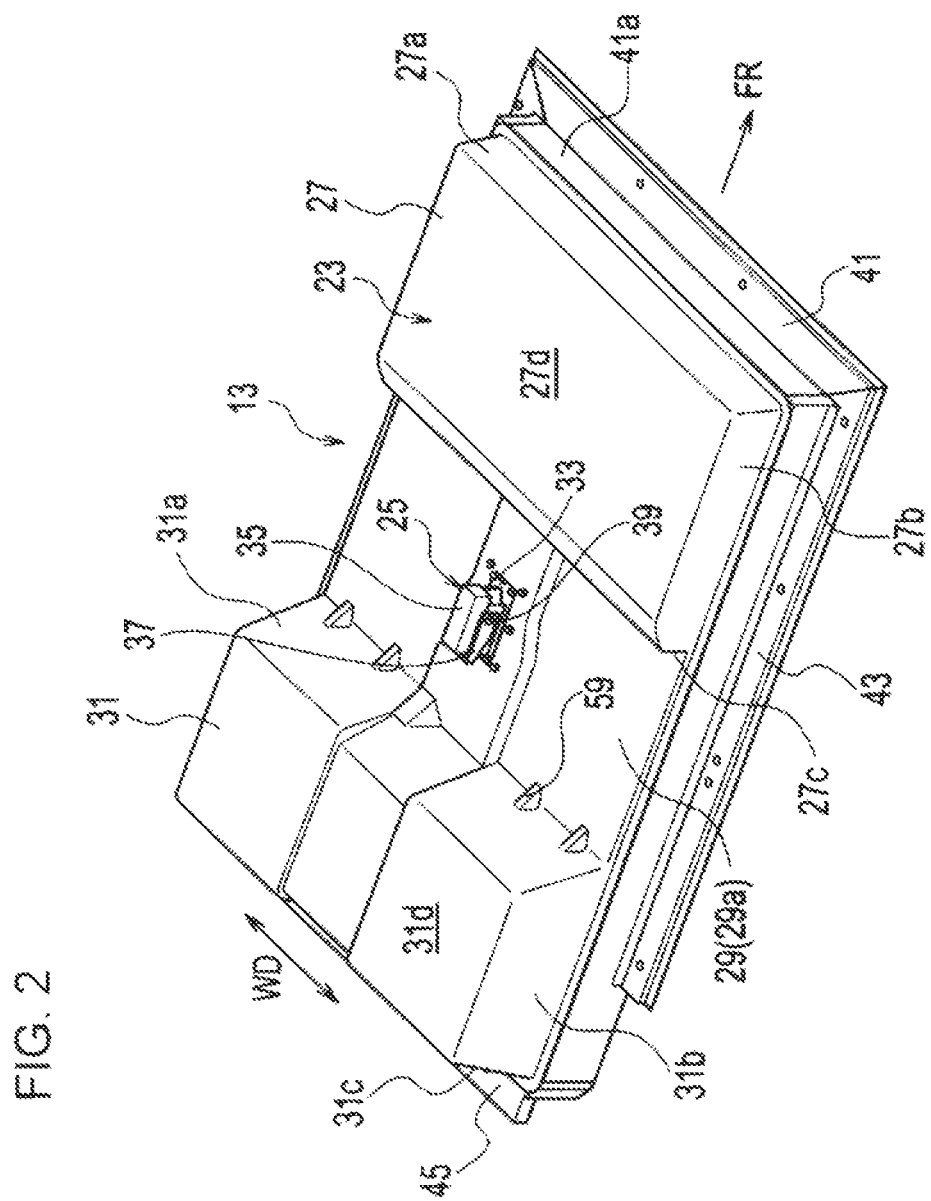
FIG. 2 is a perspective view of the battery pack, according to the embodiment of the present invention.
Figure 3:
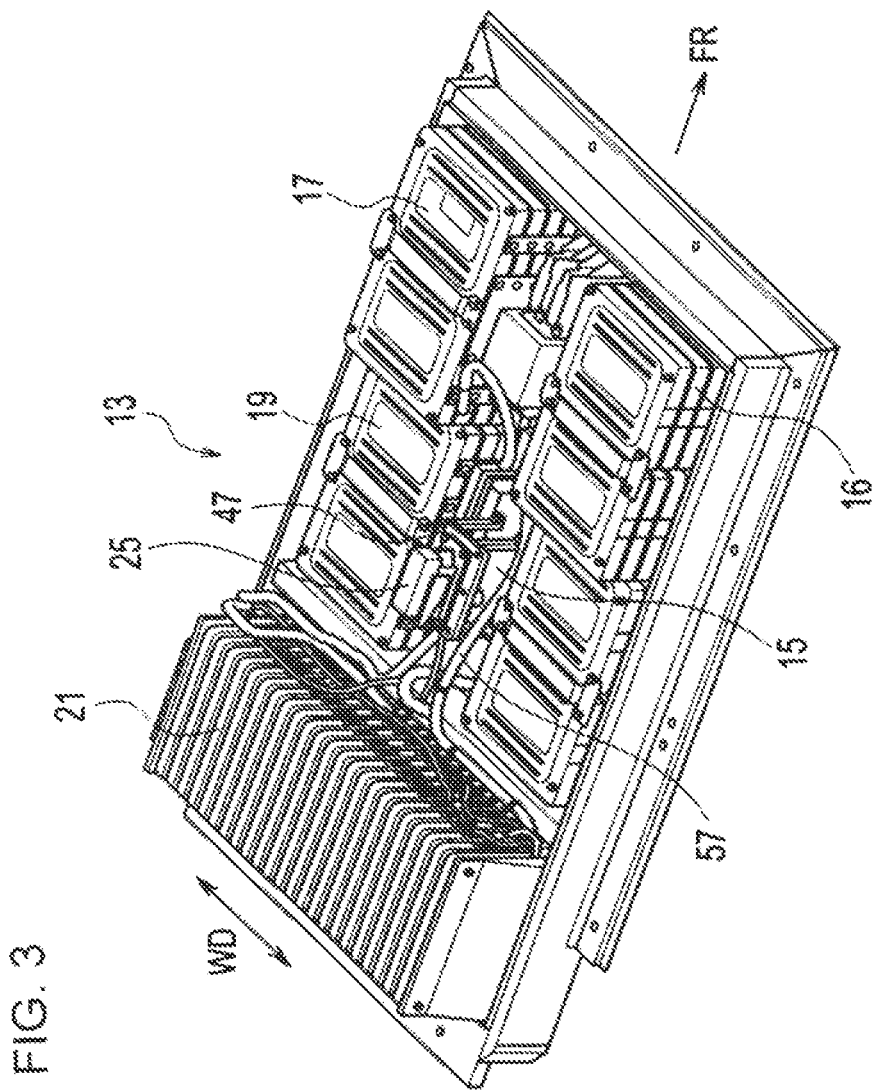
FIG. 3 is a perspective view of the battery pack with an upper face cover removed.

FIG. 2 is a perspective view of the battery pack 13 according to the embodiment of the present invention. FIG. 3 is a perspective view showing the battery pack 13 with the upper face cover 23 removed.

As shown in FIG. 2 and FIG. 3, the battery pack 13 includes: the pack base face 15 disposed at the lower side; the first battery module 17, the second battery module 19, the third battery module 21, the breaker (accessory) 25 (battery modules 17, 19, 21 and breaker 25 are disposed on the pack base face 15); and the upper face cover 23 for covering the battery modules 17, 19, 21 and breaker 25.

As shown in FIG. 2, mount brackets {41, (43, 43), 45} to be mounted for mounting the battery pack 13 to a vehicular member via a bolt (not shown in FIG. 2) is disposed around an outer periphery of the pack base face 15. Specifically, a front mount bracket 41 is disposed at the vehicular front side, a pair of right and left mount brackets 43, 43 are disposed at the vehicular right and left sides respectively, and a back mount bracket 45 is disposed at the vehicular back side.

Moreover, on the front side of the upper face cover 23, a front protruding portion 27 in a form of a upwardly protruding portion is disposed at the vehicular front side. On the vehicular back side of the front protruding portion 27, a center dent portion 29 lower than the trout protruding portion 27 is disposed in the center part in the vehicular forward-backward direction. On the vehicular back side of the center dent portion 29, a back protruding portion 31 higher than the front protruding portion 27 and center dent portion 29 is disposed. Then, a rectangular open portion 33 is formed in the center dent portion 29 of the upper face cover 23, allowing the breaker 25 to protrude from the open portion 33.

The front protruding portion 27 is flat and rectangular. The front protruding portion 27 is defined by: a front wall face 27a disposed at the front side of the vehicle 1 and extending in the vehicular widthwise direction WD; side wall faces 27b, 27b disposed at right and left sides of the vehicle 1 and extending in the vehicular forward-backward direction; a back wall face 27c disposed at the vehicular back side and extending in the vehicular widthwise direction WD; and an upper wall face 27d so disposed as to cover the front wall face 27a, side wall faces 27b, 27b and back wall face 27c from an upper side. Herein, on the vehicular front side, a flange portion 41a extending in the vehicular widthwise direction WD stands from a back end of the front mount bracket 41.

Moreover, the back protruding portion 31 of the upper face cover 23 is also flat and rectangular. The back protruding portion 31 is defined by: a front wall face 31a disposed at the vehicular front side and extending in the vehicular widthwise direction WD; side wall faces 31b, 31b disposed at both sides in the vehicular widthwise direction WD and extending in the vehicular forward-backward direction; a back wall face 31c disposed at the vehicular back side and extending in the vehicular widthwise direction WD; and an upper wall face 31d so disposed as to cover the front wall face 31a, side wall faces 31b, 31b and back wall face 31c from the upper side. The from wall face 31a is slightly inclined backward and upward. On a boundary between the front wall face 31a and the center dent portion 29, four ribs 59 are disposed at intervals in the vehicular widthwise direction WD.

Moreover, the center dent portion 29 is defined by the back wall face 27c of the front protruding portion 27, a base face 29a and the front wall face 31a of the back protruding portion 31.

Moreover, as shown in FIG. 3, the first and second battery modules 17, 19 each have such a structure that a plurality of batteries 16 each formed into a thin flat rectangular and having the same configuration are stacked in the upward and downward direction while the third battery module 21 has such a structure that the batteries 16 are arranged in parallel in the right and left directions (vehicular widthwise direction WD).

Concerning the first battery module 17, a set of four batteries 16 are stacked in the upward and downward direction and such sets are disposed at the right and left sides at a certain interval. Concerning the second battery module 19, a set of two batteries 16 are stacked in the upward and downward direction and such sets are disposed at the right and left sides at a certain interval. Concerning the third battery module 21, the batteries 16 are arranged in the vehicular widthwise direction WD. Therefore, a gap is formed between the right and left first battery modules 17 and 17 and between the right and left second battery models 19 and 19. A such, a holder member 47 is disposed between the second battery modules 19 and 19, and the breaker 25 is disposed on the holder member 47. Moreover, from the first, second and third battery modules 17, 19 and 21, a plurality of wires 57 are connected, specifically, the wire 57 from each of the first battery module 17 and the second battery module 19 is electrically connected with the wire 57 from the third battery module 21 by way of the breaker 25.

In this way, in view of heights of the first, second and third batteries 17, 19 and 21, the second battery module 19 is the lowest, followed by the first battery module 17, with the third battery module 21 highest. In other words, the height comparison is sequentially expressed by: second battery module 19<first battery module 17<third battery module 21. Herein, as shown in FIG. 2, the first battery module 17 is received in the front protruding portion 27, the second battery module 19 is received in the center dent portion 29, and the third battery module 21 is received in the back protruding portion 31. Therefore, the configuration of the upper face cover 23 is formed corresponding to the heights of the first, second and third battery modules 17, 18 and 21 which are received in the battery pack 13.

Figure 4:
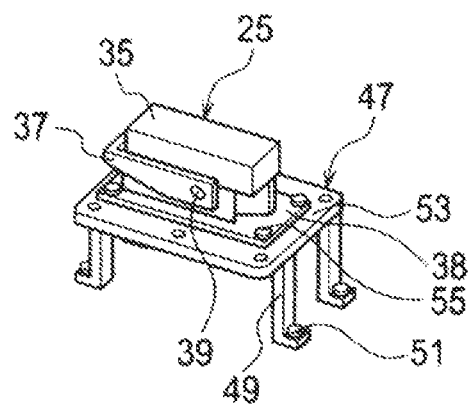
FIG. 4 is a perspective view of a holder member.

FIG. 4 is a perspective view showing the holder member 47, according to the embodiment of the present invention.

The holder member 47 includes four leg portions 49 tightened to the pack base face 15 via a bolt 51 and extending upward, and a flat shelf face 53 supported on the leg portions 49. In this way, the holder member 47 has such a structure that the shelf face 53 is disposed in a position of a certain height from the pack base face 15. On the other hand, the breaker 25 includes a base wall portion 38 disposed lower, a body portion 35 mounted to the base wall portion 38 and an operating lever 37 pivotally supported to the body portion 35 via a spindle 39. The breaker 25 has such a structure that holding and upwardly lifting the operating lever 37 rotates the breaker 25 around the spindle 38, to thereby break the electrical connection of the battery pack 13.

Hereinafter set forth is the operation and effect of the battery pack 13, according to the embodiment of the present invention.

(1) The battery pack 13 according to the embodiment is disposed at the lower part of the vehicular body and has an upper face formed with the front protruding portion 27 protruding upward and the center dent portion 29 lower than the front protruding portion 27. The center dent portion 29 is disposed at the vehicular back side of the front protruding portion 27 and the breaker 25 (accessory) is disposed at the center dent portion 29.

Therefore, the breaker 25 can be effectively prevented from a foreign matter such as a gravel stone flying from the front side of the traveling vehicle 1.

More specifically, as shown in FIG. 2, i) the front wall face 27a of the front protruding portion 27 at the upper face cover 23 and ii) the flange portion 41a have such a structure as to form a protective wall to block a collision (shock) by the foreign matter. With this, even when the foreign matter flies toward the battery pack 13 from the front part, the front wall face 27a and flange portion 41a can prevent the foreign matter's entry into the center dent portion 29. In this way, the breaker 25 can be effectively protected.

(2) The front protruding portion 27 and the back protruding portion 31 are disposed at a certain interval in the vehicular forward and backward direction, and the center dent portion 29 is disposed between the front protruding portion 27 and the back protruding portion 31. Therefore the breaker 25 can be effectively protected from the foreign matter even when the vehicle 1 makes a backward movement, not only the forward movement. Specifically, in the case of the backward movement of the vehicle 1, the back wall face 31c of the back protruding portion 31 forms a protective wall. Thereby, even when the foreign matter flies toward the battery pack 13 from the back, the back wall face 31c of the back protruding portion 31 can prevent the foreign matter's entry into the center dent portion 29. In this way, the breaker 25 can be effectively protected.

Although the present invention has been described above by reference to a certain embodiment, the present invention is not limited to the embodiment described above. Modifications and variations of the embodiment described above will occur to those skilled in the art, in light of the above teachings.

For example, making a structure of the battery pack 13 by disposing the protruding portion and dent portion in the vehicular widthwise direction WD so as to prevent the foreign matter entry from the vehicular widthwise direction WD is allowed.

3) The front protruding portion 27, back protruding portion 31 and center dent portion 29 on the upper face are so formed as to correspond to the heights of the respective first, second and third battery modules 17, 18 and 19 which are received in the battery pack 13. Therefore, the upward protruding height of the upper face covet 23 can be suppressed as low as possible, making the battery pack 13 per se thin.

(4) The breaker 25 as an accessory is disposed in the center dent portion 29. The breaker 25 is an essential part for allowing the breakage of the electrical connection of the battery pack 13. Thereby, protecting the breaker 25 can securely keep the functions of the battery pack 13.

INDUSTRIAL APPLICABILITY

With the battery pack according to the present invention, the protrusion is formed higher than the dent portion where an accessory is disposed. With this, even when a foreign matter flies toward the battery pack, the protrusion serves as a protective wall, thus preventing the foreign matter from entering the dent portion. In this way, the accessory can be effectively protected.

This application is based on a prior Japanese Patent Application No. P2009-169010 (filed on Jul. 17, 2009 in Japan). The entire contents of the Japanese Patent Application No. P2009-169010 from which priority is claimed are incorporated herein by reference, in order to take some protection against translation errors or omitted portions.

The scope of the present invention is defined with reference to the following claims.

The invention claimed is:

1. A battery pack disposed at a lower part of a vehicular body, the battery pack comprising:
a plurality of battery modules;
a breaker; and
an upper face cover configured to cover the plurality of battery modules such that the plurality of battery modules are disposed within an interior of the upper face cover, the upper face cover comprising
a front protruding portion disposed at a vehicular front side that protrudes in a vehicular upward direction,
a back protruding portion disposed at a vehicular back side that protrudes in the vehicular upward direction,
a dent portion disposed between the front protruding portion and the back protruding portion, the dent portion being formed lower than the front protruding portion and the back protruding portion, and
an aperture in the dent portion forming an open portion,
wherein the breaker protrudes from the interior of the upper face cover to an exterior of the upper face cover through the aperture forming the open portion, and
wherein the breaker is configured to break an electrical connection of a wire connected to each battery module.

2. The battery pack according to claim 1, wherein the dent portion is disposed at the vehicular back side of the front protruding portion.

3. The battery pack according to claim 1, wherein a plurality of protrusions are disposed at a certain interval in a vehicular forward and backward direction, and
the dent portion is disposed between adjacent protrusions.

4. The battery pack according to claim 1, wherein the plurality of battery modules comprises a first battery module, a second battery module, and a third battery module, and
wherein each of the front protruding portion, the dent portion, and the back protruding portion of the upper face cover is so formed as to correspond to a height of the first battery module, the second battery module, and the third battery module, respectively.

5. The battery pack according to claim 1, wherein the dent portion is disposed substantially in a center of the battery pack.

6. The battery pack according to claim 1, further comprising a pack base face,
wherein the plurality of battery modules and the breaker are arranged on the pack base face.

7. The battery pack according to claim 1, wherein the breaker includes an operating lever, and
wherein the breaker is configured to break the electrical connection of the wire connected to each battery module by operating the operating lever at the exterior of the upper face cover.

8. The battery pack according to claim 1, wherein the breaker is disposed in a center of the dent portion with respect to a vehicular width direction.

9. The battery pack according to claim 1, wherein the dent portion is disposed between the front protruding portion and the back protruding portion substantially in a center of the battery pack in a vehicular forward and backward direction.

10. The battery pack according to claim 9, wherein the back protruding portion is disposed at a height different from a height of the front protruding portion in the vehicular upward direction.

11. The battery pack according to claim 9, wherein the back protruding portion is disposed at a height greater than a height of the front protruding portion in the vehicular upward direction.

12. The battery pack according to claim 9, wherein the plurality of battery modules comprises a first battery module, a second battery module, and a third battery module, and
wherein each of the front protruding portion, the dent portion and the back protruding portion is so formed as to correspond to a height of the first battery module, the second battery module, and the third battery module, respectively.

* * * * *